United States Patent [19]

Páris et al.

[11] 4,371,343

[45] Feb. 1, 1983

[54] PROCESS AND SYSTEMS FOR THE ELECTRONIC GENERATION OF WIDE-ANGLE MOVING IMAGES FOR TRAINING IN THE NAVIGATION OF SHIPS

[75] Inventors: Philippe Y. J. Páris, Fontenay le Fleury; Alain Couturier, La Celle St. Cloud, both of France

[73] Assignee: Le Materiel Telephonique Thomson-CSF, Columbes, France

[21] Appl. No.: 125,656

[22] Filed: Feb. 28, 1980

[30] Foreign Application Priority Data

Mar. 2, 1979 [FR] France .................................. 79 05497

[51] Int. Cl.³ .............................................. G09B 9/06
[52] U.S. Cl. ........................................ 434/29; 358/104
[58] Field of Search ..................... 358/104, 183, 81, 82; 434/25, 26, 29, 40, 43, 44

[56] References Cited

U.S. PATENT DOCUMENTS

| | | | |
|---|---|---|---|
| 3,619,912 | 11/1971 | Conant et al. | 434/43 |
| 3,697,681 | 10/1972 | McCoy | 358/104 |
| 3,838,856 | 10/1974 | Takeya et al. | 434/20 |
| 3,961,133 | 6/1976 | Bennett | 358/183 |
| 4,001,499 | 1/1977 | Dowell | 434/43 |
| 4,106,218 | 8/1978 | Polstorff | 434/34 |
| 4,129,883 | 12/1978 | Stubben | 273/85 G |

*Primary Examiner*—Vance Y. Hum
*Assistant Examiner*—Leo P. Picard
*Attorney, Agent, or Firm*—Roland Plottel

[57] ABSTRACT

The invention relates to simulators, for example, simulators of a ship's bridge and the visual display of the scene as viewed from that bridge. Elementary images are juxtaposed, forming an image of a large angle where, without discontinuity, a moving object appears on several television monitors positioned adjacent one another. The images are read simultaneously from "synthetic images" which are stored in a memory. The moving portion of the image, e.g. a ship, is inlayed in a background or environment image. The image of the object is furnished from a camera which is focused on a model of the object, in the example a ship or ships. There is a synchronization between the delayed line signal of the television camera in relation to the synchronizations of the signals throughout the system.

8 Claims, 16 Drawing Figures

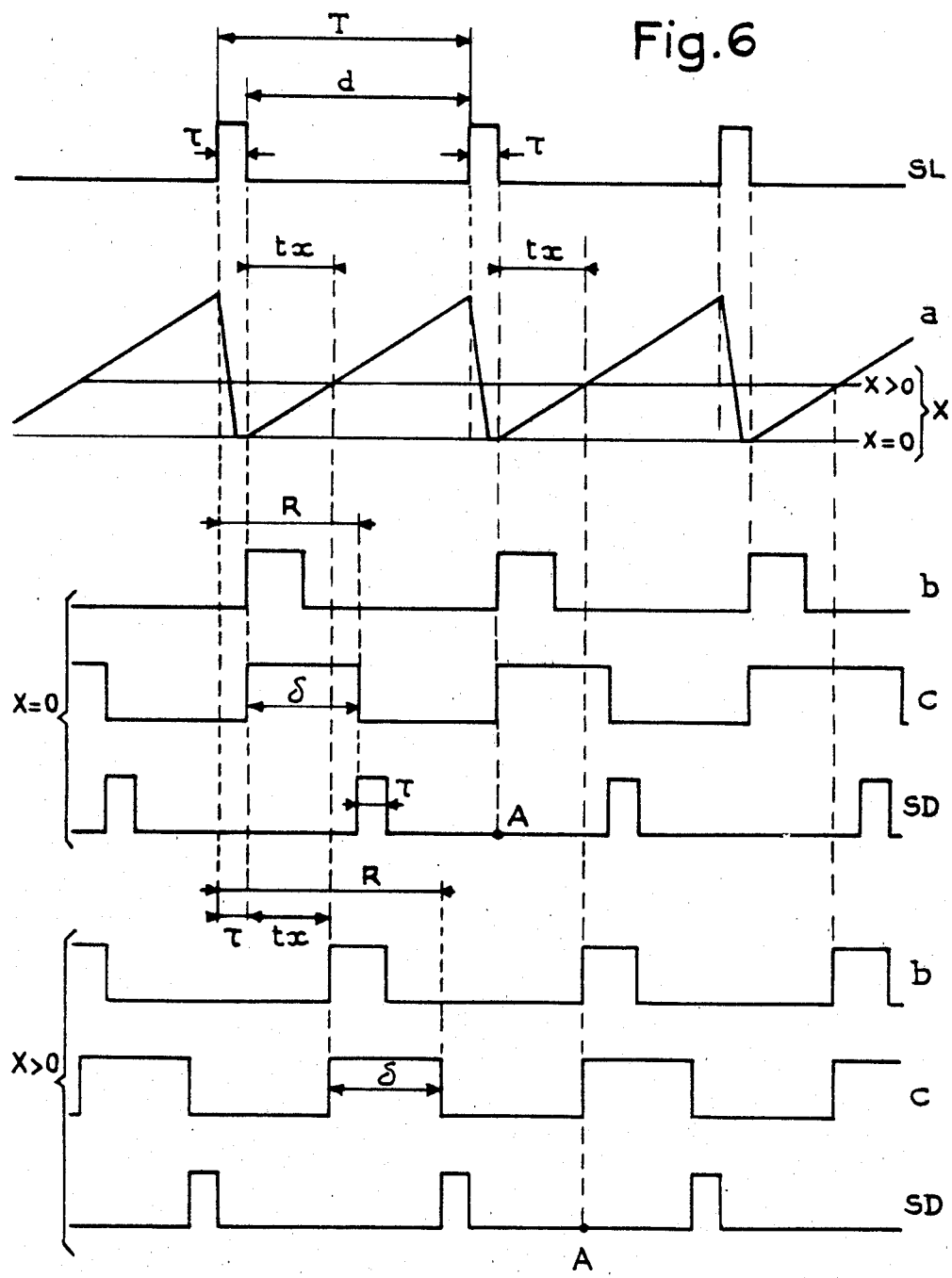

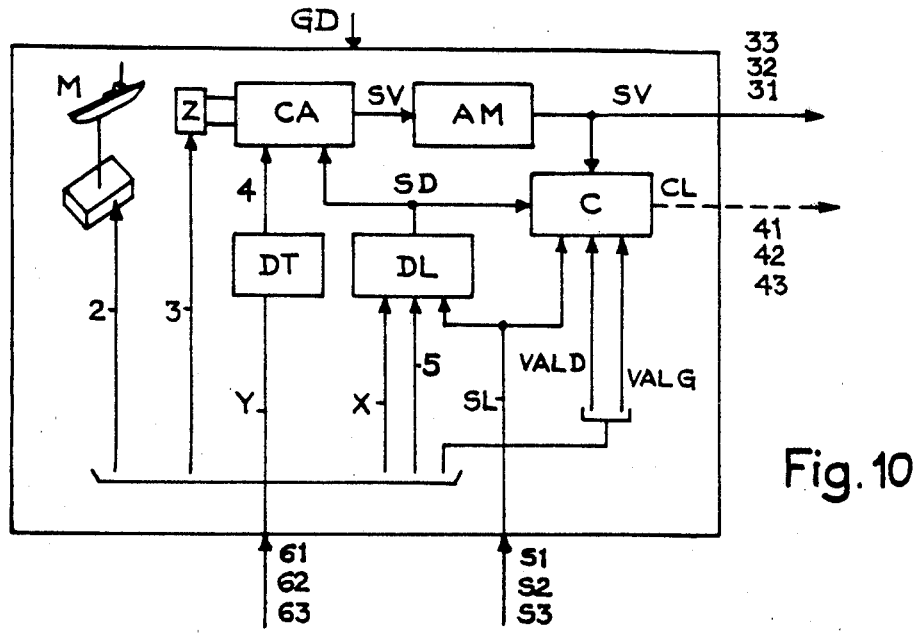
Fig. 10
Fig. 11
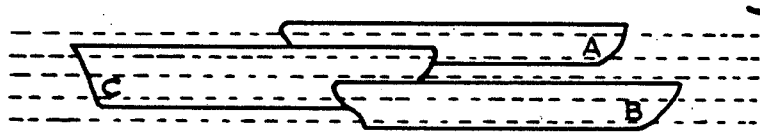
Fig. 12
Fig. 13

PROCESS AND SYSTEMS FOR THE ELECTRONIC GENERATION OF WIDE-ANGLE MOVING IMAGES FOR TRAINING IN THE NAVIGATION OF SHIPS

The present invention relates in general to the generation of a wide-angle moving image from distinct elementary images each displayed on a cathode-ray tube.

The problem of the optical juxtaposition and collimation of these elementary images to constitute a wide-angle image at infinity has already been solved by different known arrangements, including in particular that described in patent application No. 2,360,103 filed by the present applicant.

The present invention relates more exactly to a system electronically generating images, conceived such that the elementary images being displayed on the cathode-ray tubes of one of the above said arrangements, the representation and the passage of moving objects from one elementary image to an adjacent image are achieved without discontinuity in the wide-angle image.

An important area of application of the present invention is constituted by systems for training in activities requiring long-range all-round visual observation. Practical training in the control of vehicles, for example, very often cannot be given with real vehicles for reasons of cost, safety or unavailability, but by means of appropriate training systems. The systems for generating wide-angle moving images described in the present patent application thus relates more particularly to systems for training in the navigation of ships. It is nevertheless obvious that the invention can have other areas of application.

Systems for training in the navigation of ships, which reproduce on land as realistically as possible the navigation bridges of ships, comprise equipment simulating real navigation equipment. The outside world seen from such navigation bridges is an environmental characteristic difficult to reproduce. The impression of space, necessary for realistic training, can be given only by a wide-angle image apparently located at considerable distance. The field of view should also be as large as possible in azimuth, i.e. in the horizontal direction. In the vertical direction, however, assuming that large ships navigate at fairly large distances from the shore, a field of view corresponding to an elevation angle of approximately 10° to the horizon would appear to be sufficient. The wide-angle image, and consequently the elementary images constituting it, must change as a function of ship's motion and orientation and naturally as a function of the maritime traffic observed.

At the present time, the least costly commercially available equipment capable of producing such changing images are cathode-ray tube image generators of the television monitor or projector type, whose images can be "processed" in accordance with conventional so-called "inlay" electronic processes. The representation of a wide-angle multiple image of a moving object passing from one elementary image to another has already been the subject of various patents. In the U.S. Pat. Nos. 3,659,920 and 3,619,912 as well as the British Pat. No. 1,380,188, apparent motion of the object is obtained simply by delaying the monitor synchronization signals, which does not allow the representation of several moving objects having different motions. The system described in the U.S. Pat. No. 3,560,644 requires the voltage gradients of the camera and display projector scan signals to be modified as a function of the attitudes and positions of objects, thereby preventing the use of standard equipment.

The process in accordance with the present invention allows the representation of several objects using conventional cameras and monitors.

The elementary images displayed on different television monitors are obtained by the simultaneous reading of as many synthetic images recorded in a memory, such as a video recorder of the magnetic disc type.

The synthetic images are generated one by one in a cyclic manner by inlaying the images of objects produced by television cameras on an environment image.

Each of the cameras is oriented with respect to a model and is synchronized by line blanking signals individually delayed in an appropriate manner with respect to the so-called reference line blanking signal common to the television monitors.

Other characteristics and advantages of the process and systems for image generation in accordance with the invention are made apparent by the following description of practical examples.

FIG. 1 is a diagram describing the process in accordance with the invention.

FIG. 2 schematically represents the wide-angle image consisting of elementary images and defines the coordinates of a reference point A on the model of the object in these images.

FIG. 6 represents the timing diagrams of signals relating to the line-shift circuit.

FIG. 10 illustrates in a compact manner the shifted image generator specific to the system in accordance with the invention.

FIG. 11 shows three ships partially masking each other.

FIG. 12 illustrates the order of the ships expressed in both decimal and binary form.

FIG. 13 represents a table summarizing the operation of a conventional priority encoder.

The description of the present invention is limited to an image having a wide angle of view in the horizontal direction only. It is obvious that the invention can be easily extended on the same principles to an image having a wide angle in both the vertical and horizontal directions. The objects are considered to be moving ships constituting the maritime traffic encountered by the "school ship", the latter being simulated by the navigation bridge of the training system. Nevertheless, any of these objects could also be an island, a buoy, a jetty or a stretch of coastline whose apparent motion with respect to the school ship must also be simulated. All these motions are determined by conventional computing and programming methods in accordance with the exercise, predetermined or not, and in accordance with any decisions taken by the instructor. In the following text, the terms "object" and "ship" are used indifferently.

A television camera of conventional design is pointed at the model of a ship M (FIG. 1), whose drawing for the sake of the explanation is divided into eight numbered parts. The attitude of the model varies as a function of the orientation of the ship to be simulated, whilst the variation of the apparent size of the ship is obtained by varying the focal length of the camera lens. The model is placed on an orientation support such that it is centered with respect to the rotational axis of this support, thereby simulating the ship's heading. The coordinates of this ship are measured in the wide-angle image and in the displayed elementary images by the coordinates of a reference point A defined by the intersection of the support rotational axis and the base plane of the model. The optical axis of the camera points at this point and an image IM of the model against a black background is obtained on the image tube of the camera. The dimensions and distance of the model are determined such that the angle under which the model appears remains inside the field of view of the camera lens. The camera is synchronized by a delayed line blanking signal SD and produces an object image signal SV. The model M is placed in front of a sufficiently dark background such that levels n1 and n2 of signal SV, corresponding to the brightnesses of the model and background, are distinct.

Figure 2:
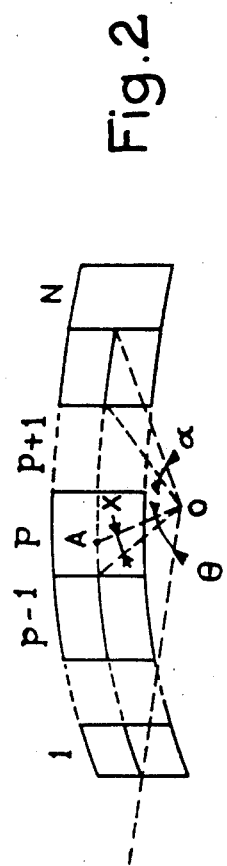

The wide-angle image (FIG. 2) consists of an assembly of N elementary images displayed on N television monitors and apparently juxtaposed horizontally at the level of the horizon by optical means which do not constitute part of the invention. Each elementary image subtends a viewing angle $\alpha$ in the horizontal direction. The order number p of the particular elementary image in which is located at a given instant the reference point A is given by the whole-number part of the quotient resulting from dividing the azimuth $\theta$ of this reference point in the wide-angle image by the angle $\alpha$. The azimuth angle X of point A in the image of order number p is measured by the remainder obtained when dividing the azimuth angle $\theta$ by angle $\alpha$ $$\theta = p\alpha + X$$

Figure 1:
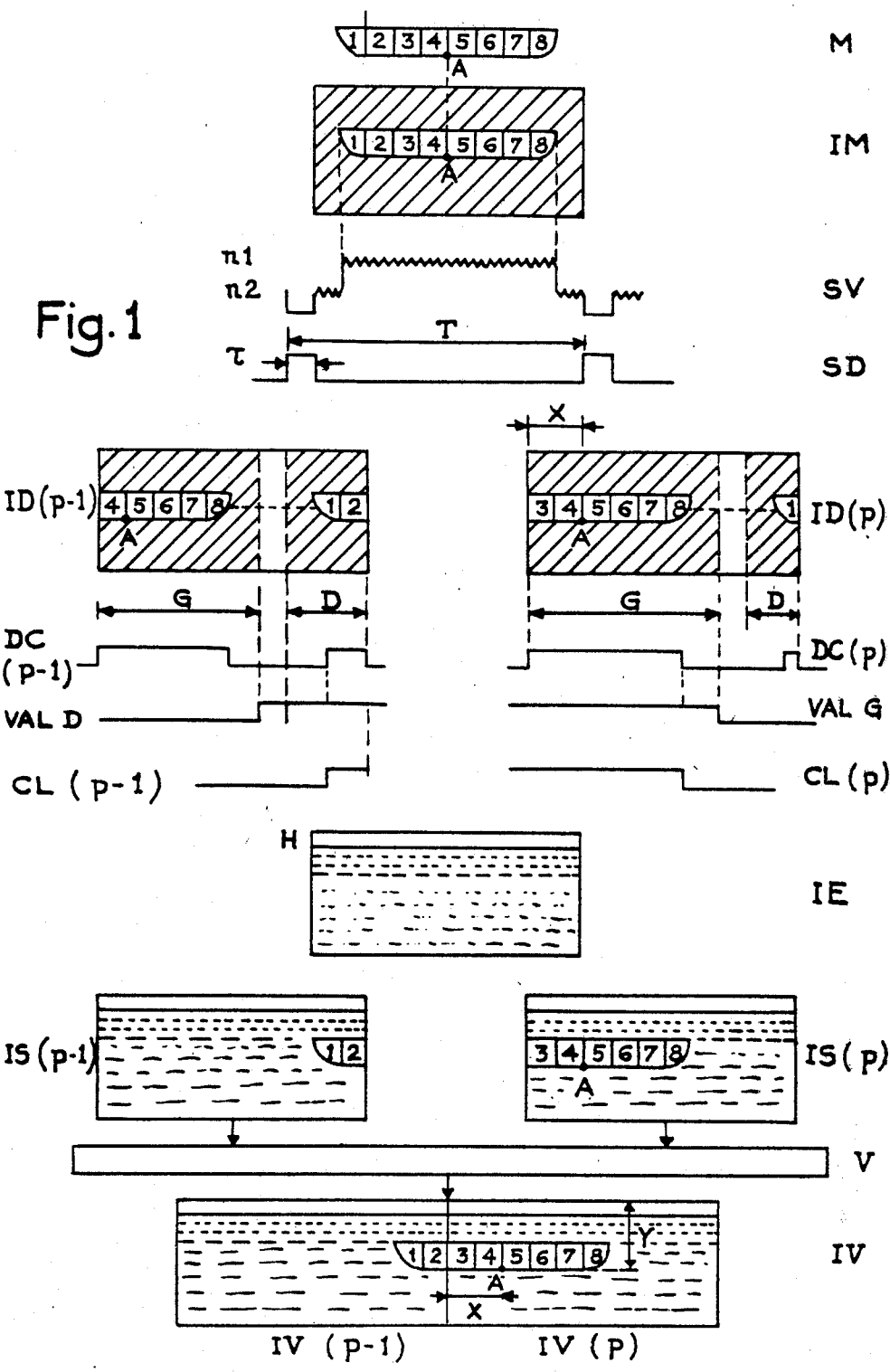

FIG. 1 refers to the case where the azimuth angle X is less than half of the angle $\alpha$ and for which the ship, depending on the angle at which it is seen, is likely to appear partly on the displayed image of order number p−1. The results for cases where the azimuth angle X is either greater than or equal to half the angle $\alpha$ may be easily deduced from this. Signal SD is delayed by a given interval with respect to the line blanking reference signal SL fed to all the monitors. This last signal is not shown in FIG. 1. Signal SV thus produces on the screen of a monitor synchronized by signal SL a "shifted" image such as image ID(p) or image ID(p−1), depending on the delay of signal SD. A vertical black band divides each of these images into two parts: a right-hand part D and a left-hand part G either side of this band. Each right-hand part consists of a certain fraction of the left-hand part of image IM. Moreover, a part of image IM is missing in each of the shifted images, this part corresponding to part 2 of the model for image ID(p), and corresponding to part 3 of the model for image ID(p−1) The fractions of the signal corresponding to the two missing parts in image IM are coincident in time with the pulses of signal SL fed to the monitor, and consequently cannot be displayed on this tube.

The displayed elementary images IV are obtained by the simultaneous reading of N so-called synthetic images IS recorded sequentially on a magnetic-disc video recorder V (FIG. 1). The synthetic images are determined one by one from an environment image IE and, when the ship should appear in the elementary image considered, from a shifted image ID and by inlaying the latter in an appropriate manner on the environment image. The environment image represents the surface of the sea in a figurative or "stylized" manner or, in a still simpler version, consists of a horizontal line H simulating the horizon and separating two zones of different colour. This image may be produced by conventional synthetic-image generation circuits.

FIG. 1 relates more particularly to the generation of two elementary images IV(p−1) and IV(p), in which the same ship should appear partially. The corresponding synthetic images IS(p−1) and IS(p) are obtained by inlaying on image IE the shifted image ID(p−1) and the shifted image ID(p), these last two images being obtained from image IM, an appropriate delay for each affecting signal SD. The delay R(p) corresponding to image ID(p) is determined such that the azimuth of reference point A in this image is equal to the calculated value X. Image ID(p−1) is shifted such that the missing part of image IM in image ID(p), i.e. part 2, appears in the right-hand part of this image. Since the width of the missing part is determined by the duration $\tau$ of the pulses of signal SL, neglecting the duration of the framing optical margins, the delay corresponding to image (p−1) is given by:

$$R(p-1) = R(p) - \tau$$

The delayed images are inlaid on the environment image such that the more or less dark background is eliminated and also such that the useful parts of the images, the left-hand part for image ID(p−1) and the right-hand part for image ID(p) are also eliminated. Image inlaying is performed line by line and determined by an inlay key signal CL resulting from the simultaneous presence of a conventional object detection signal DC and a validation signal VAL. This validation signal, differing with the order number of the image, can be easily obtained, as described below, from signal SD and signal SL. In the case of image ID(p), the validation signal designated by VAL G eliminates the right-hand part of the shifted image. In the case of image ID(p−1), the validation signal designated by VAL D eliminates the left-hand part of the shifted image.

When the azimuth angle X exceeds $\alpha/2$, and depending on the angle at which the ship is seen, the ship is likely to appear in the elementary image of order number (p+1) located to the right of the elementary image of order number p. In this case, the delay R(p) corresponding to image ID(p) is determined such that the azimuth angle X in this image is again equal to the calculated value X, whilst the delay corresponding to the image (p+1) is given by:

$$R(p+1) = R(p) + \tau$$

The validation signal corresponding to the shifted image ID(p) is then a signal VAL D eliminating the left-hand part of the image, whilst the validation signal corresponding to the shifted image ID(p−1) is a signal VAL G which eliminates the right-hand part of the image. When the azimuth angle X is considered as being equal to $\alpha/2$, the shifted images ID(p−1) and ID(p+1) do not exist, whilst both signals VAL D and VAL G are used in succession.

Figure 3:
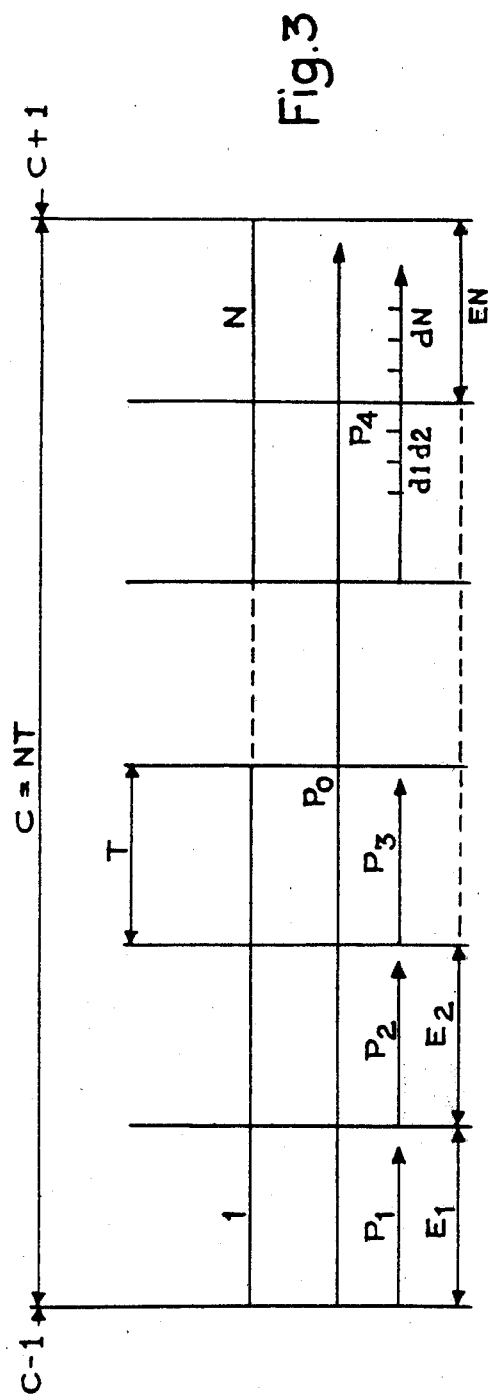
FIG. 3 represents the basic computer cycle.

All the operations described are determined and initiated in a cyclic manner by a conventional processor. The basic cycle C consisting of N image periods T is shown in FIG. 3. The duration of a period T is, for example, 40 ms for the 625-line and 50 Hz system defined by the CCIR.

A monitor program P0 calls the computing programs P1, P2, P3 and P4, initiates interrupts and controls the input/output interface. Program P1 computes the coordinates and heading of the school ship as a function of the speed and tiller angle determined by the trainee on the training system bridge. Program P2 calculates the coordinates, heading and speed of the ship to be simulated. These data may be predetermined or modified by the instructor during the course of an exercise. Program P3 calculates the coordinates of the ship to be simulated with respect to the school ship. In particular, It determines the azimuth $\theta$, the azimuth X, the elevation angle Y and the distance and orientation of this ship with respect to the school ship. It initiates the attitude changes of the model resulting from these calculations. Program P4 is concerned with the display, i.e. with the calculation of data d1, d2, ... dN, which determine during each cycle the configuration of each image displayed. These data are effectively used for constituting and recording in a sequential manner the N synthetic images during the next cycle C+1 and respectively during time intervals E1, E2, ... EN. These data include in particular the order number of the calculated image, the azimuth X, the type of validation signal (VAL D or VAL G), the delay to be given to the blanking signal SD (R, R−$\tau$, R+$\tau$), and the address of the track on the video recorder magnetic disc.

The fact that the synthetic images are computed and updated periodically imposes an upper limit to the speed with which an image can change. In the present case of a navigational trainer for ships, practice has shown that because of the relatively slow changes in the scene displayed, an updating cycle NT of 120 ms (i.e. three elementary images constituting the wide-angle image) is perfectly acceptable. This number can nevertheless be increased considerably, depending on the subjective opinion of observers and the type of exercise simulated. Although the number N of elementary images is limited in this manner, the generation of a panoramic moving image is possible by means of systems obtained by generalizing the process described above. A description of these systems is given below.

Figure 4:
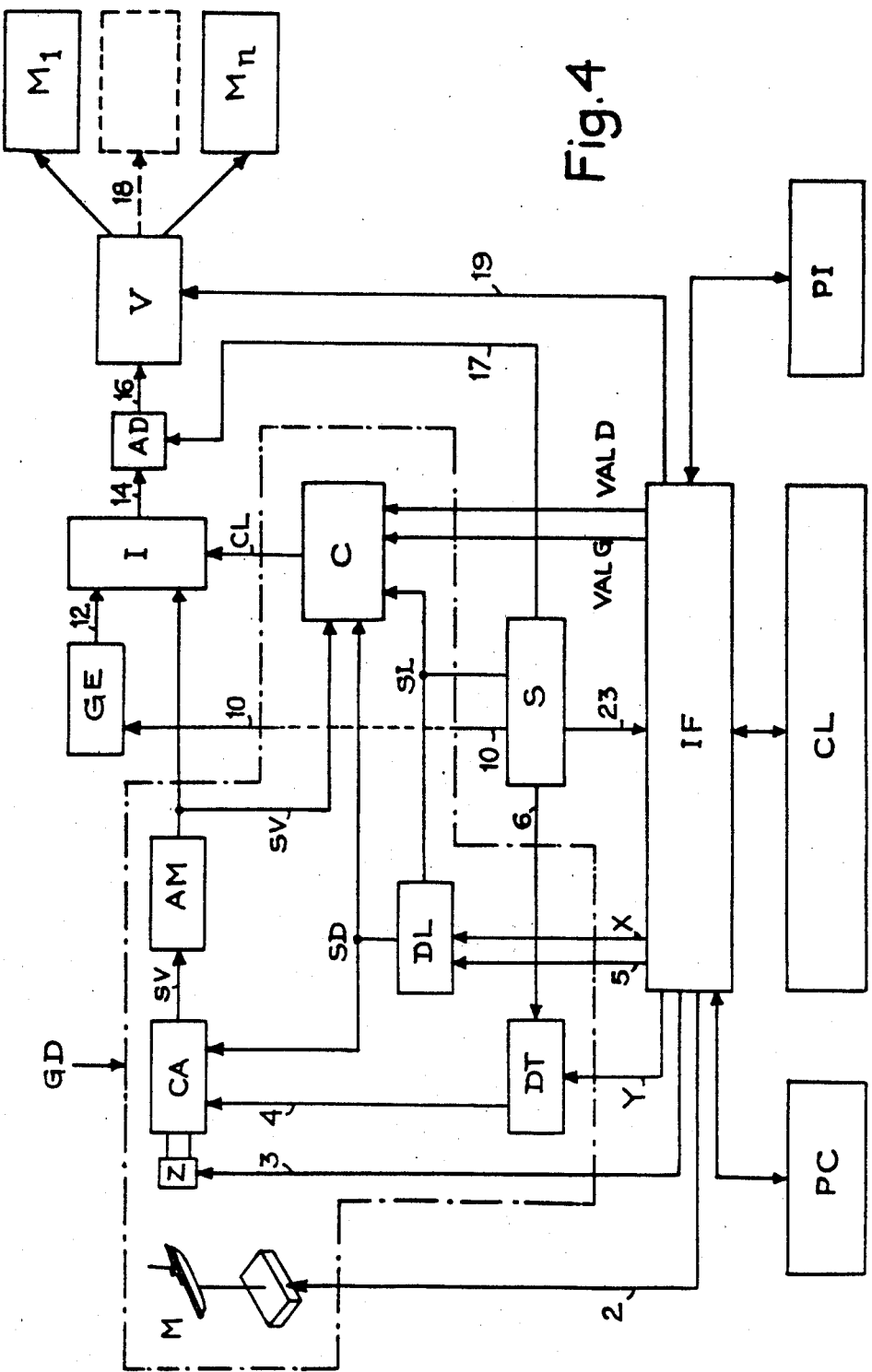
FIG. 4 is the block diagram of an image generating system in accordance with the invention and for which the image is animated by a single object.

The block diagram of the system electronically generating moving images in accordance with the invention and which is based on the process described is shown in FIG. 4. The system makes it possible to display a moving ship in a wide-angle image.

Television camera CA is fed with the delayed line blanking signal SD, a delayed raster blanking signal 4 and a signal 3 controllng the zoom-lens Z of the camera. It feeds the video-frequency image signal SV to a conventional adaptation and alignment circuit AM. Once adapted and aligned, signal SV is applied to the inlay control circuit C and the inlay device I. A generator GE produces the video-frequency environment image signal 12 and receives conventional synchronization signals 10. The inlay device I consists of an electronic 2-way analogue gate. It is fed with signal SV, signal 12 and the inlay key signal CL. It produces a signal 14 corresponding to the synthetic image IS. This signal 14 is constituted either by signal 12 or by signal SV, depending on the logical level of signal CL. A summing circuit AD adds to signal 14 the necessary synchronization signals 17 (including the line blanking reference signal) for constituting a composite video-frequency signal 16. The magnetic-disc video recorder V is fed with the composite signal 16 and the track address signal 19. The magnetic disc of this video recorder possesses at least as many recording tracks as there are elementary images displayed. Signal 16 is recorded during each period T on the track whose address is contained in signal 19. The tracks are read simultaneously during each image period T and the read signals 18 are applied to the corresponding monitors. Circuit C is fed with signal SD, signal SL and the two validation signals VAL D and VAL G. It produces signal CL. A line shift circuit DL produces signal SD. It is fed with signal SL, an azimuth signal X and a delay signal 5. A raster shift circuit DT produces signal 4. It is fed with an elevation angle signal Y and a raster blanking signal 6. The system constituted by model M, camera CA with its zoom-lens Z, circuits DL and DT as well as circuit C may be considered as a shifted image generator GD. The synchronization system S produces signal SL, signal 6, the synchronization signals 17 and the synchronization signals 23 required by the programming. The interface IF is fed with signals 23. It produces signals 2 controlling the model attitude, signal 3 controlling the zoom-lens Z, the azimuth signal X and the elevation signal Y, signal 5, signals VAL D and VAL G as well as signal 19. In addition, the interface exchanges all the control and display signals required for training between the bridge PC and the instructors's console PI.

Figure 5:
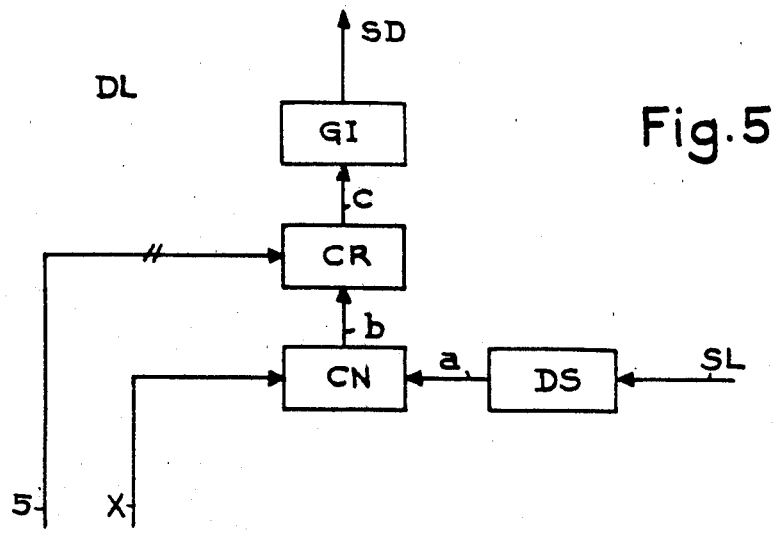
FIG. 5 is the detailed block diagram of a line-shift circuit specific to the system in accordance with the invention.

The detailed block diagram and the signal timing diagrams corresponding to the line shift circuit DL are shown in FIGS. 5 and 6. The line blanking reference signal SL is applied to a sawtooth generator DS (FIG. 5). The useful part (a) of this signal shown in FIG. 6 consists of the positive slope located between two consecutive pulses of signal SL. A comparator circuit CN produces a pulse b each time the sawtooth reaches level X. In order to clarify the description, the signal timing diagrams have been drawn on the assumption firstly that X is equal to zero and then greater than zero. Signal b is applied to a delay circuit CR producing on each received pulse an output pulse c whose duration $\delta$ is determined by the binary delay signal 5. A pulse generator GI produces on each pulse c received a pulse of duration $\tau$ identical with that of signal SL. This circuit also produces signal SD, which represents a delay P with respect to signal SL. The delay R is given by:

$$R = \tau + tx + \delta$$

in which tx represents the scan time corresponding to azimuth X. The three values $\delta(p)$, $\delta(p-1)$ and $\delta(p+1)$ of $\delta$ correspond to the values $R(p)$, $R(p-1)$ and $R(p+1)$ assumed by R. The value of $\delta(p)$ is determined such that the azimuth of point A for the image of order number $p_d$ is equal to zero when X is equal to zero. The values $\delta(p)=d/2$, $\delta(p-1)=d/2-\tau$, and $\delta(p+1)=d/2+\tau$ are obtained, d being equal to $T-\tau$. The raster shift circuit 6 is not shown. It can consist of a circuit similar to circuit DL, for which the delay $\delta$ is constant since the motion of the ship in elevation for the system described occurs in one image only.

Figure 7:
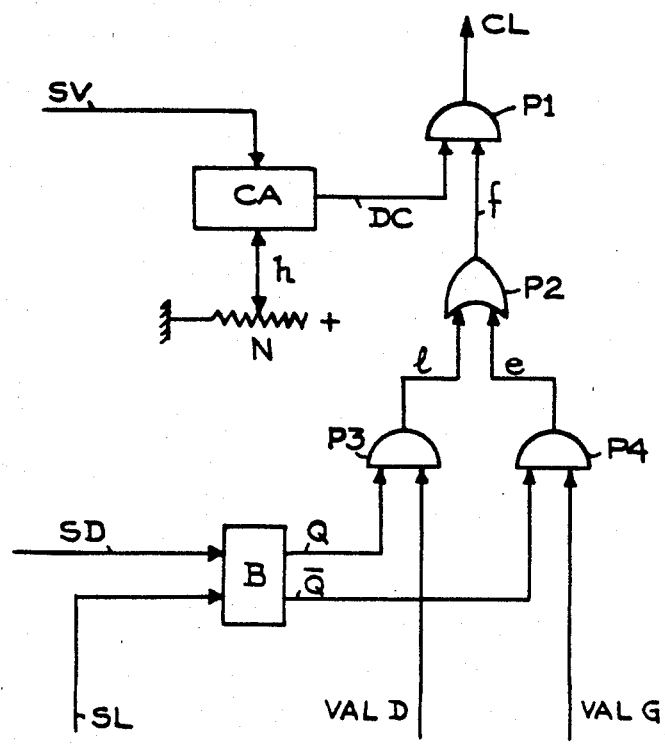
FIG. 7 is the detailed diagram of an inlay control circuit specific to the system in accordance with the invention.
Figure 8:
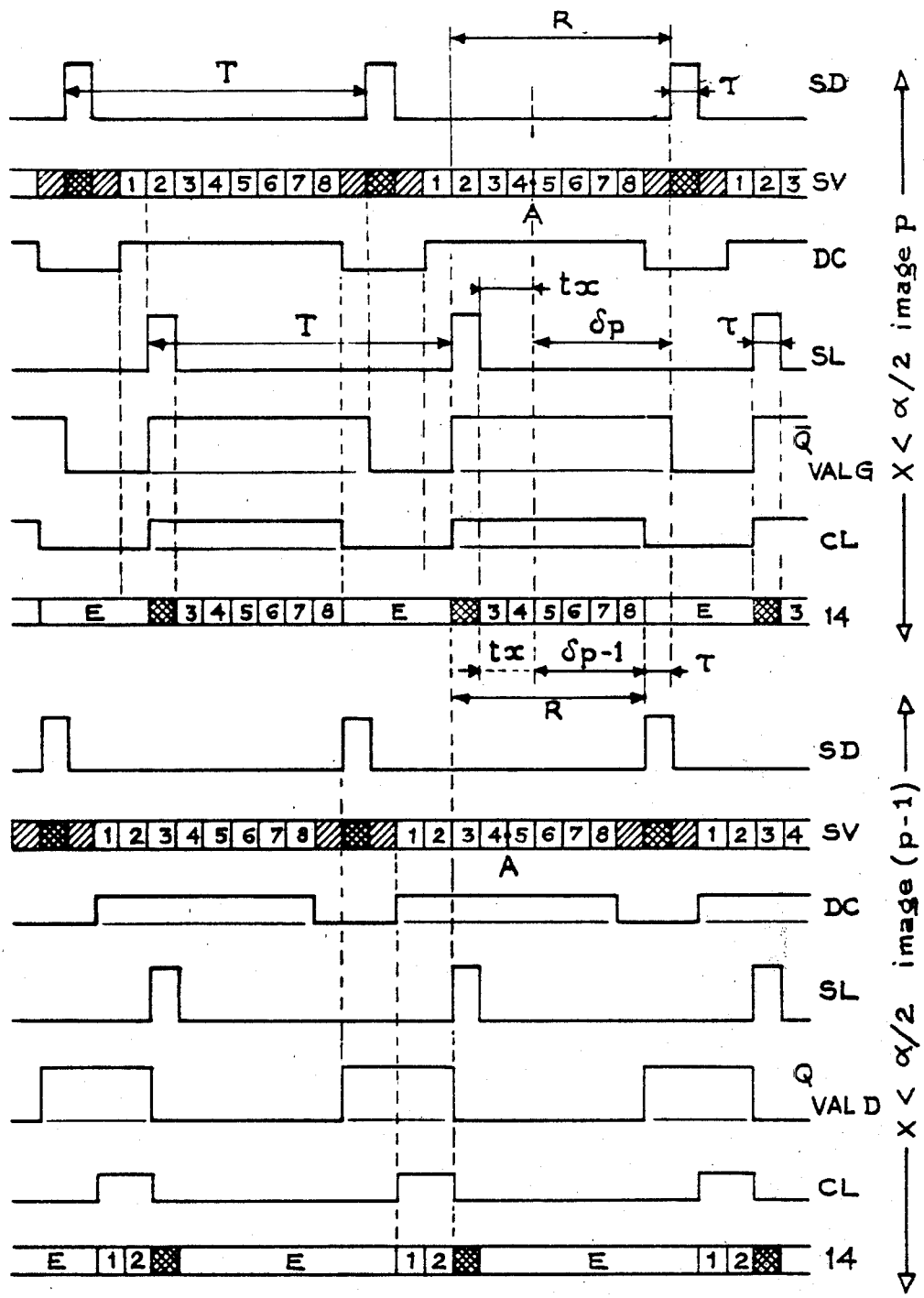
FIG. 8 represents the timing diagrams of signals relating to the inlay control circuit.

The detailed diagram of the inlay control circuit C and the timing diagrams of the corresponding signals are shown in FIGS. 7 and 8. Signals SL and SD are used for switching a conventional flip-flop B in one direction or in the other. The two signals on outputs Q and $\overline{Q}$ of circuit B are applied to two AND gates P3 and P4 respectively. These two gates are also fed with signal VAL D and signal VAL G respectively. Gate P3 produces a signal 1 identical with signal Q when signal VAL D is a logical "1", and no signal when signal VAL D is a logical "0". Gate P4 produces a signal e identical with signal $\overline{Q}$ when signal VAL G is a logical "1", and no signal when signal VAL G is a logical "0". Both signals 1 and e are applied to an OR gate P2. This gate produces a signal f identical with signal Q or signal $\overline{Q}$, depending on whether signal VAL D or signal VAL G is a logical "1". Signal SV obtained from the camera and circuit AM is applied to an analogue comparator CA. The object detection signal DC produced by this comparator is a logical "1" when the amplitude of signal SV exceeds that of the comparison signal h. It is "0" if this is not the case. The level of signal h lies between the two levels n1 and n2 of signal SV (FIG. 1). Signals DC and f are applied to an AND gate P1. This gate produces signal CL which controls the operation of the inlay device I. Signal CL is a logical "1" only if both signals DC and f are "1's". It is "0" if this is not the case. Signal 14 produced by the inlay device I is therefore indentical with signal SV when signal CL is "1", or identical with signal 12 corresponding to the environment image when signal CL is "0".

The timing diagrams of the signals shown in FIG. 8 are divided into two parts. The top part relates to the determination and inlay of the image of order number p, whilst the bottom part relates to the image of order number p−1. Signal SV is represented by the trace which would theoretically correspond to it on the monitor. This trace comprises eight parts corresponding to those of the model drawn in FIG. 1. Signal 14 consists of signal SV when when signal CL is a logical "1". When this is not the case, signal 14 consists of the environment image signal 12.

Figure 9:
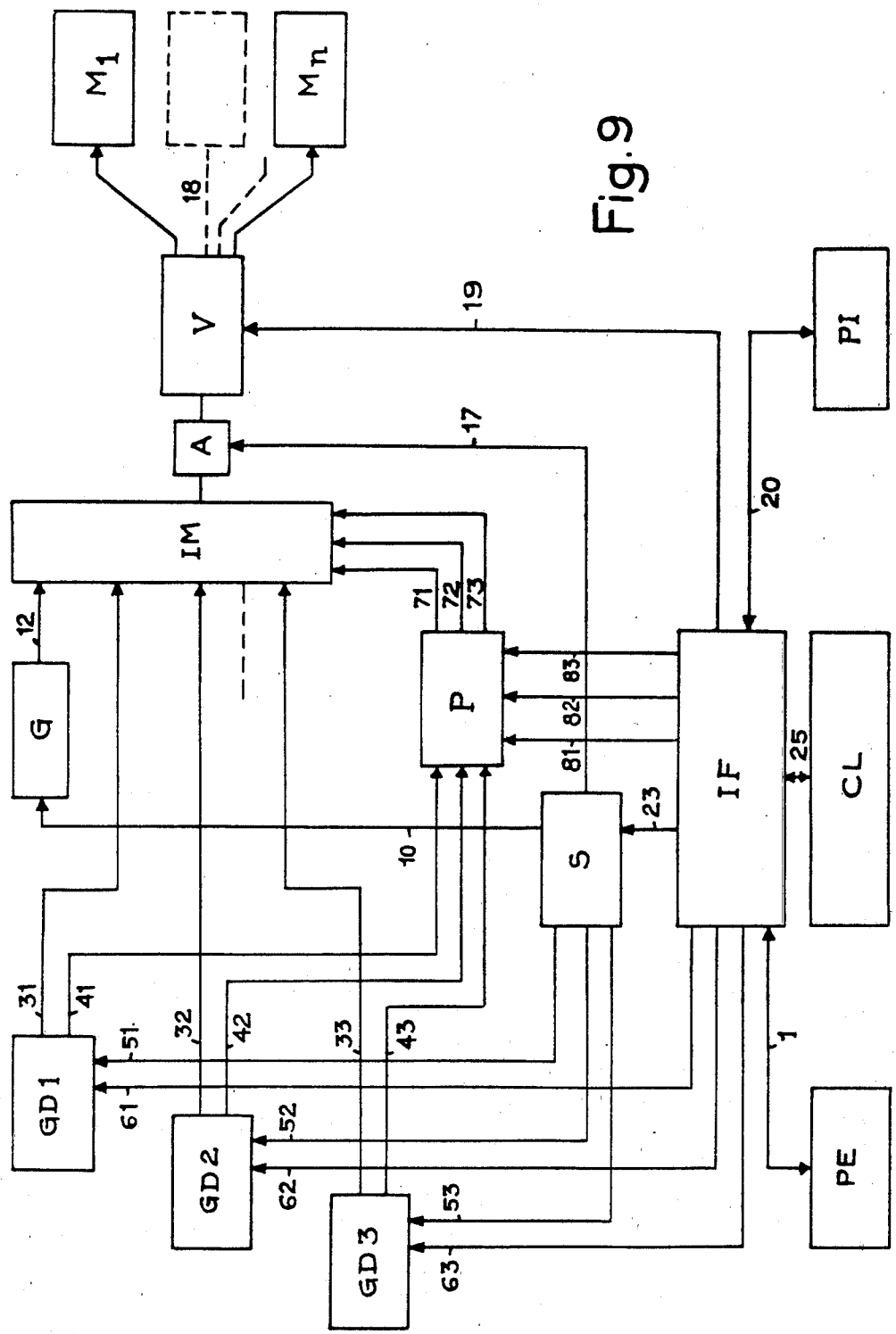
FIG. 9 illustrates an improved variant of the system in accordance with the invention, for which the image is animated by M objects.

The block diagram of a first improved variant of the moving image electronic generation system in accordance with the invention is shown in FIG. 9. This variant enables M objects to be displayed in the environment image. The example illustrated by the block diagram corresponds to the presence of three such objects. The simultaneous presence of several objects implies that the latter may mask each other, with the result that this variant must possess a system P determining the results of masking.

A shifted image generator GD as defined in FIG. 4 corresponds with each object. The block diagram of this generator is illustrated again in a more compact form by FIG. 10. In order to simplify the representation of the manner in which this generator is connected with the remainder of the system, the signals have been divided as a function of their destinations in order to constitute only four multiple connections or not. The signals inside the rectangle of FIG. 10 have the same notations as those in FIG. 4, whilst the connections are identified by a triple numbered notation corresponding to the three shifted image generators of the practical example described.

The first variant of the system (FIG. 9) thus consists essentially of the shifted image generators GD1, GD2 and GD3, the mask calculator P and the inlay device IM. The video-frequency image signals 31, 32 and 33 are fed to the inlay device. The key signals 41, 42 and 43 are applied to the mask computer P which feeds control signals 71, 72 and 73 to the inlay device.

At each instant, the processor establishes and updates the order of the ships as a function of their distances from the school ship, and determines their order numbers R whose values are fed to the mask computer P in the form of order-number signals 81, 82 and 83. FIG. 11 thus shows three ships A, B and C assumed to be at different distances. Their order numbers R expressed in decimal form D or binary form E are shown in FIG. 12. The order-number signals are therefore digital signals representing the binary numbers E.

Figure 14:
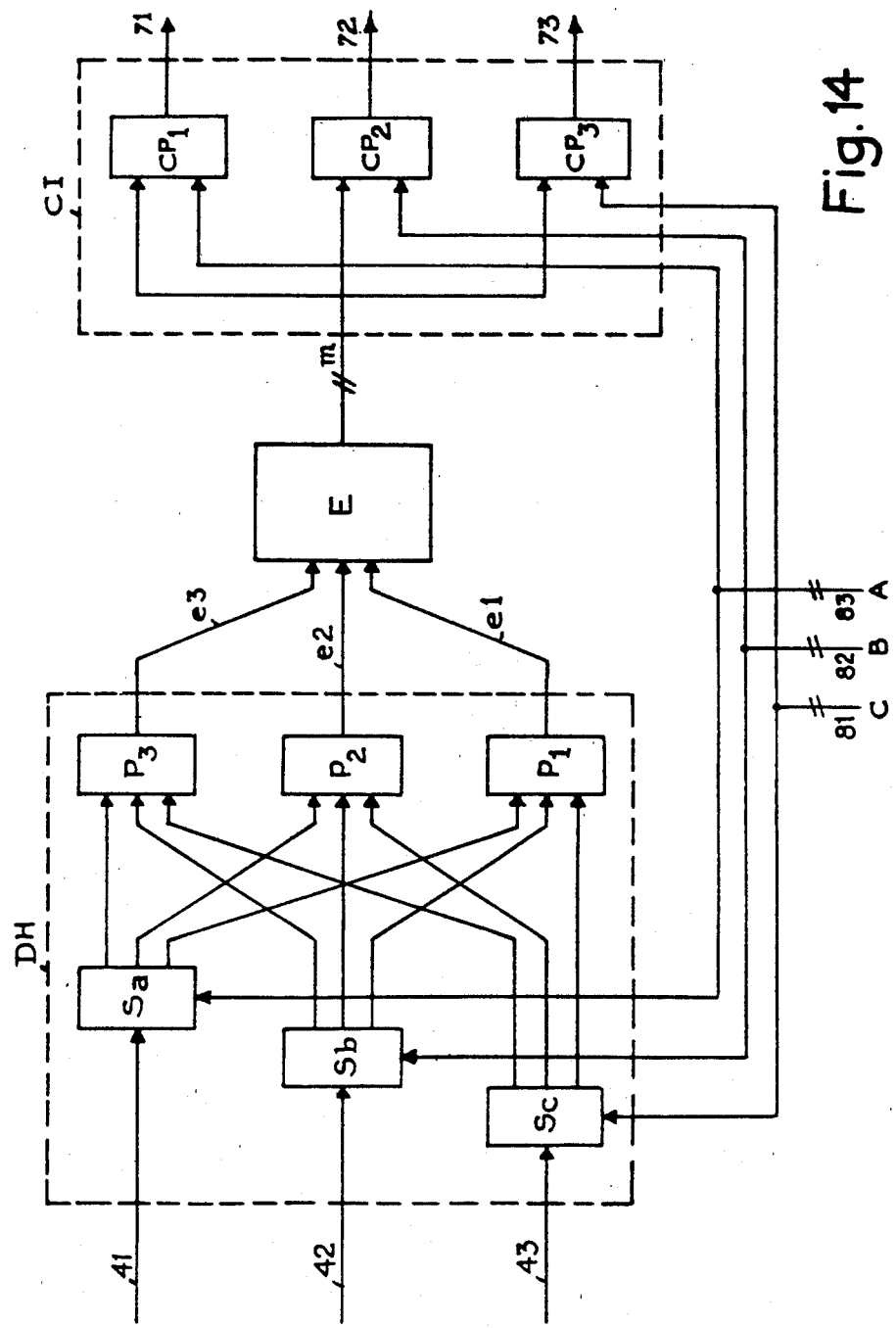
FIG. 14 is the detailed block diagram of a device determining the effects of masking and specific to the first variant of the system in accordance with the invention.

The detailed block diagram of the mask computer is shown in FIG. 14. This device consists of a hierarchical inlay discriminator DH, a priority encoder E and an inlay control circuit CI. Discriminator DH possesses M selection circuits Sa, Sb, Sc, etc., as well as M OR gates P1, P2, P3, etc. Each selector assigned to one of the M objects is fed with the key signal 41, 42 or 43, as well as the order-number signal 81, 82 or 83, corresponding to the object to which it is assigned. It possesses M outputs, each assigned to a distance order number, and produces the key signal on the output determined by the order-number signal. Each OR gate is assigned with a distance order number. Its inputs are connected to the outputs of the selectors assigned with the order number of the gate considered. The group of signals e1, e2 and e3 produced by the gates and classified in accordance with the gate order numbers constitute a hierarchical M-bit inlay signal. This signal represents by a series of M bits placed in the order determined by the classification and for each order number the presence or absence of an object (ship) in the direction defined by the image scan. The priority encoder E is a conventional commercially available circuit. The principle of this circuit is illustrated by FIG. 13, assuming for the sake of simplicity that the circuit E considered has three 1-bit inputs, such as e1, e2 and e3, and one 2-bit output S. The signals applied to each of the inputs are logical "1's" or "0's". The binary numbers which may be represented by the three input signals can be divided into three groups g1, g2 and g3. Group g1 comprises all the numbers for which a logical "1" is present on input e1, the logical levels on the remaining two inputs having any value. Group g2 comprises all the numbers for which a logical "0" is present on input e1 and a logical "1" is present on input e2, whilst the level on input e3 may have either value. Group g3 consists of only one number: that for which logical "0's" are simultaneously present on inputs e1 and e2, whilst a logical "1" is present on input e3. The hierarchical inlay signal is applied to the priority encoder E, which produces a signal m representing the binary value S of the least order number (corresponding to the least distance and the nearest ship), which is occupied by a single visible ship and masking all others in the direction defined by the image scan. The control circuit CI determines for each point of the synthetic image the identity of the single ship of which a point should be inlaid at the position of the point considered in the image, and consequently operates the inlay circuit IM. The control circuit CI consists of M comparators CP1, CP2, CP3, etc., assigned to M objects respectively. Each is fed with the minimum order number as well as the order-number signal corresponding to the ship to which the circuit considered is assigned. When these two signals are identical, the comparator produces an inlay order signal 71, 72 or 73. The inlay circuit IM is of conventional design, selecting and producing one of the signals 31, 32, 33 and 12, as a function of the control signals 71, 72 and 73. It consists, for example, of four contactors, each connected between one of the inputs and the output of circuit IM. Three contactors are controlled by the three signals 71, 72 and 73 respectively. Circuit IM must also possess a 3-input OR gate, followed by an inverter, such that the fourth contactor corresponding to signal 12 is operated when none of signals 71, 72 and 73 is present.

The systems described above cannot, at the present time, produce a resulting moving image of a panoramic nature, since the number N of elementary images cannot be high because of the limitation imposed on the image updating cycle duration.

In order to obtain a sufficiently high number N, however, it is merely necessary to generalize the process and systems described, in order to obtain a resulting image consisting of Z groups of n elementary images. In each of these groups, the elementary images having the same order number are updated simultaneously. This enables a relatively low value (120 ms) to be maintained for the cycle duration nT, whilst the number $N=Z\times n$ may be large, depending on the value of Z, enabling an all-round moving image consisting of some 30 elementary images to be obtained if required.

These systems are characterized by the fact that they possess amongst other components Z groups of n monitors, a magnetic-disc video recorder with Z groups of n tracks, and Z inlay devices.

Figure 15:
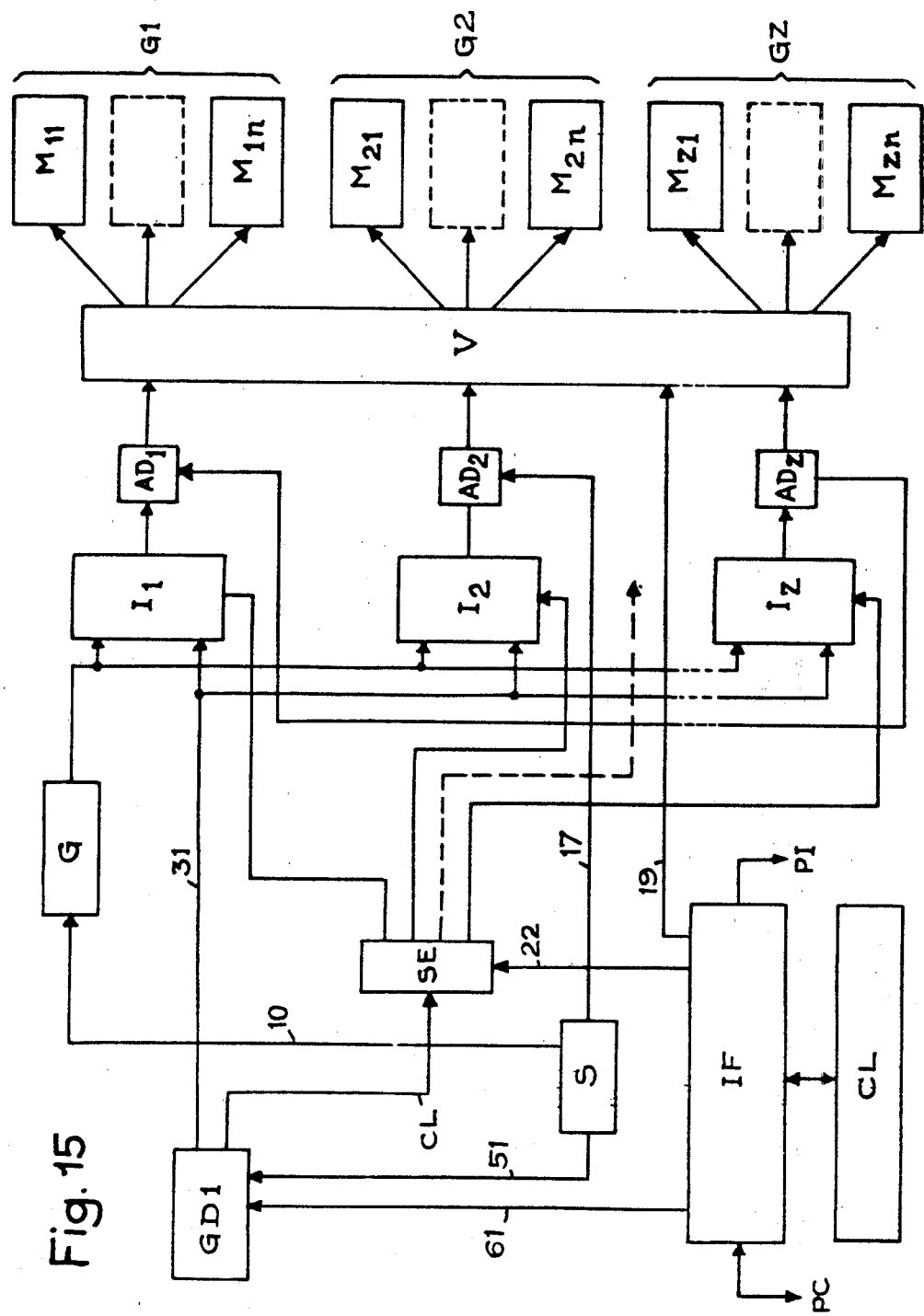
FIG. 15 is the block diagram of a second variant of the system in accordance with the invention, for which the image is animated by an object and is constituted by Z groups of n elementary images.

FIG. 15 is the block diagram of a system electronically generating a panoramic image animated by a single moving object.

This diagram may be compared with that of FIG. 4, of which most of the annotations are adopted. In addition to the characteristic components mentioned, i.e. Z groups of n monitors $G_1, G_2 \ldots G_Z$, a magnetic-disc video recorder V with Z groups of n tracks, and Z inlay devices $I_1, I_2 \ldots I_Z$, the system possesses an additional characteristic component constituted by a selector SE. This selector possesses a first input to which is applied signal CL, Z outputs connected to the Z inlay devices, and a second input to which is applied a control signal 22 produced by interface IF. By means of this selector and as a function of the control signal 22, the key signal CL is applied to the inlay device associated with a particular groups of monitors for which one of the latter displays the object.

Figure 16:
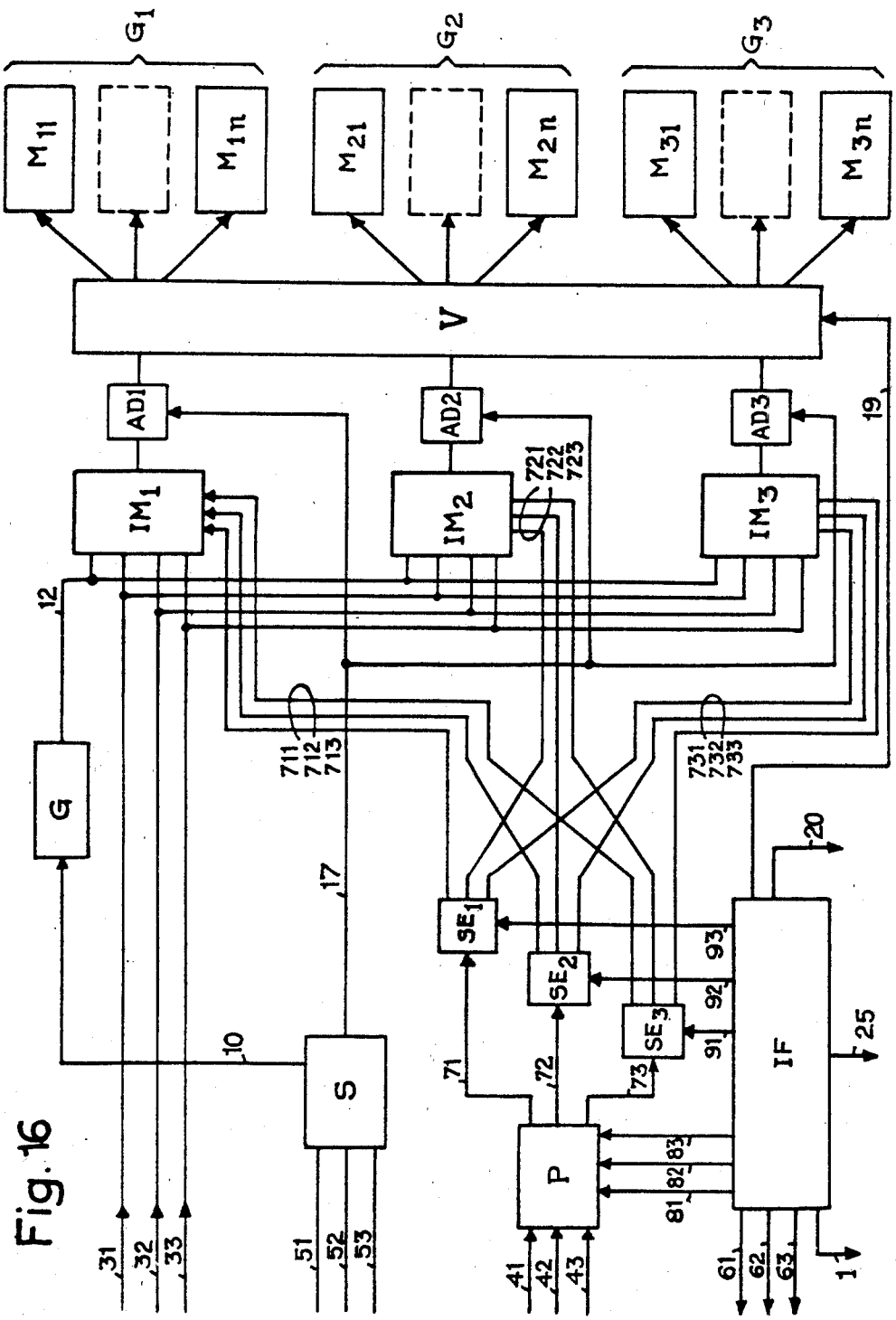
FIG. 16 is the block diagram of a third variant of the system in accordance with the invention, for which the image is animated by several objects and is constituted by Z groups of n elementary images.

FIG. 16 shows the partial block diagram of a system electronically generating a panoramic image animated by several objects.

For the sake of simplicity, this block diagram is limited to illustrating a system possessing three groups of n elementary images capable of displaying three objects. This system can be immediately generalized. This block diagram may be compared with that of FIG. 9, of which most of the annotations have been adopted. The shifted image generators $GD_1$, $GD_2$ and $GD_3$, the processor, the instructor's console and the bridge are not shown. The most general system possesses amongst other components the following characteristic components: Z groups of n monitors $G_1, G_2 \ldots G_Z$, a magnetic-disc video recorder V with Z groups of n tracks, Z inlay devices $IM_1, IM_2 \ldots IM_Z$, and M selectors $SE_1, SE_2 \ldots SE_M$ corresponding to M objects. Each of these selectors possesses a first input to which is applied one of the inlay control signals obtained from the mask computer P, Z outputs connected to the Z inlay devices, and a second input to which is applied one of the control signals 91, 92 and 93 obtained from the interface.

Although the principles of the present invention are described above in relation with specific practical examples, it should be clearly understood that the said description is given as an example only and does not limit the scope of the invention.

In particular, it is clearly apparent that the system in accordance with the invention may be used independently of the optical system described in the patent application mentioned above and filed by the present applicant. The elementary images can also be obtained by projection by means of television projectors instead of being displayed on television monitors.

We claim:

1. A process for electronically generating wide-angle moving images, especially for systems providing training in the navigation of ships, by means of which a wide-angle image constituted by the apparent juxtaposition of elementary images subtending respectively an angle α on as many television monitors, and by means of which an object represented on these images moves from one image to the next without discontinuity, comprising the steps of:
    (a) defining the coordinates of the object, which form the wide-angle image and the displayed elementary images, by the coordinates of a reference point (A) determined by the intersection of the support rotational axis of a model of the object (M) and the base of this model;
    (b) pointing the optical axis of a camera at the reference point;
    (c) determining the dimensions and distance of the object as well as those of the model such that the camera angle of view always exceeds the apparent angle subtended by the model;
    (d) feeding the camera with a synchronization signal, which is a line blanking signal (SD) delayed with respect to the line blanking reference signal fed to all the monitors, this delay being proportional to the position of the object in the moving image;
    (e) obtaining an object video signal (SV) from the camera and applying it to a monitoring cathode-ray tube synchronized by the line blanking reference signal to produce a shifted object image (ID (p−1) and ID (p)) divided vertically by a black band corresponding to the delayed line blanking signal fed to the camera, into a right-hand part and a left-hand part on either side of this band;
    (f) producing a given number of elementary images by feeding a memory, such as a magnetic-disc video recorder, the line blanking reference signal for the simultaneously triggered readings of as many synthetic images recorded in this memory;

(g) determining the order p of the elementary image in which the reference point is located at a given instant by taking the whole-number part of the quotient resulting from the division of the reference point azimuth $\theta$ in the wide-angle image by the angle $\alpha$;

(h) determining the azimuth X of the reference point in the image of order number p, and taking the remainder resulting from the division of the azimuth $\theta$ by the angle $\alpha$;

(i) producing the synthetic images one-by-one in a cyclic manner, as a function of the order number of the elementary image considered by electronic inlaying of the shifted ship image onto an environment image in the case of an elementary image of order number p, p−1, or p+1, and by simple recording of the environment image for the other order numbers;

(j) determining the delay R(p) of the delayed line blanking signal fed to the camera for an image of order number p such that the azimuth of the reference point in this image is effectively equal to the value X, the delays R(p−1) and R(p+1) of the delayed line blanking signal fed to the camera for an image of order number p−1 and for an image of order number p+1 being R(p)−$\tau$ amd R(p)+$\tau$, the interval $\tau$ being the duration of the delayed line blanking signal as well as that of the line blanking reference signal;

(k) validating the inlay when the azimuth X is less than $\alpha/2$ for the left-hand part of the shifted image of order number p, as well as for the right-hand part of the image of order number p−1, and when the azimuth is greater than $\alpha/2$ for the right-hand part of the image of order number p as well as for the left-hand part of the image of order number p+1.

2. A process for electronically generating wide-angle moving images, especially for systems providing training in the navigation of ships, by means of which a wide-angle image constituted by the apparent juxtaposition of elementary images subtending respectively an angle $\alpha$ on as many television monitors, and by means of which an object represented on these images moves from one image to the next without discontinuity, comprising the steps of (a) defining the coordinates of the object, form the wide-angle image and the displayed elementary images, by the coordinates of a reference point (A) determined by the intersection of the support rotational axis of a model of the object (M) and the base of this model;

(b) pointing the optical axis of a camera at the reference point;

(c) determining the dimensions and distance of the object as well as those of the model such that the camera angle of view always exceeds the apparent angle subtended by the model;

(d) feeding the camera with a synchronization signal, which is a line blanking signal (SD) delayed with respect to the line blanking reference signal fed to all the monitors, this delay being proportional to the position of the object in the moving image;

(e) obtaining an object video signal (SV) from the camera and applying it to a monitoring cathode-ray tube synchronized by the line blanking reference signal to produce a shifted object image (ID (p−1) and ID (p)) divided vertically by a blank band corresponding to the delayed line blanking signal fed to the camera, into a right-hand part and a left-hand part on either side of this band;

(f) producing synthetic images of the environment images (IE);

(g) producing synthetic images (IS(p), and IS (p−1)) by inlaying the shifted object images in those of the environment images;

(h) recording in sequence the synthetic images in a memory (V) such as a video recorder;

(i) reading simultaneously all the synthetic images recorded and needed in order to display on the monitors the elementary images displayed simultaneously thereon (IV);

(j) varying the attitude of the model to simulate its movements in relation to its viewing on the screens; and (k) varying the lens of the camera in order to change the apparent size of the object as viewed on the monitors.

3. A system for generating and displaying a wide-angle moving image comprising
a video inlaying device (I) fed by an object image video signal (SV), an environment video signal (12) and an inlay key signal (CL), and providing an output signal (IS) of the object video signal or the environment video signal as a function of the key signal;
a first image generator (GE) producing said environment image signal (12);
a second image generator (GD) producing said object image signal; said generator including a television camera (CA) pointing at a moving object model (M);
a plurality of television monitors ($M_1, \ldots, M_n$), each displaying an elementary image, and positioned to display the wide-angle moving image which extends over more than one monitor;
a synchronization circuit (S) for providing a video line blanking reference signal (SL), a raster blanking signal (6);
an interface circuit for providing an azimuth signal (X) proportional to the model configuration;
means for providing a delay signal (5);
means for providing two validation signals (VAL D and VAL G) corresponding to the right hand and left hand parts respectively of an image shifted between two monitors, and an address signal (19);
said second image generator including
a line shift circuit circuit (DL) fed with said line blanking reference signal (SL), said delay signal (5) and said azimuth signal (X), and producing a delayed line blanking signal (SD) which is applied to said camera; and
an inlay control circuit (C) fed with the object image signal (SV), the line blanking reference signal (SC), the delay line blanking signal (SD) and said two validation signals validating the right hand part and the left hand part respectively the shifted image which will extend over two monitors, and providing said key signal to said inlay circuit;
said camera being connected to said line shift circuit and synchronized by said delayed line blanking circuit;

a memory (V), such as a video recorder, connected to said inlay circuit and fed with a composite object-environment video signal as well as said address signal (19) and line blanking reference signal; and said memory feeds a signal to each of said monitors;

said memory having as many distinct recording tracks as their are monitors in the system, the composite video frequency signal being recorded in succession on each of the tracks as a function of the address signal, and the signals fed to all the monitors resulting from means for simultaneous reading of the tracks, triggered by the line blanking reference signal;

a computer producing an order number signal representing the order numbers of M objects, that includes:

M shifted image generators, producing M key signals and M shifted image signals;

means for determining the effects of masking, fed with the M key signals as well as the M order number signals, and producing M inlay control signals;

said inlay device being fed with the M shifted image signals, the M inlay control signals and the environment image signal, and producing the composite image signal.

4. A system for generating electronically wide-angle moving images in accordance with claim 3, characterized by the fact that the mask computing system possesses:

an inlay hierarchical discriminator fed with the M key signals and the M order number signals, and producing an M-bit inlay hierarchical signal;

a conventional so-called priority encoder circuit fed with the inlay hierarchical signal and producing the minimum order number signal;

an inlay control circuit fed with the minimum order number signal as well as the M order number signals, and producing the M inlay control signals.

5. A system for generating electronically wide-angle moving images in accordance with claim 4, characterized by the fact that the inlay hierarchical discriminator possesses:

M selectors with M outputs, each assigned to one of the object order numbers, these circuits being fed with the key signal and the order number signal corresponding to the object to which it is assigned, the key signal applied to the input of a selector being transferred by the latter to only that output assigned to the order number defined by the order number signal;

M OR gates with M inputs, each assigned to an order number, the signals obtained on the outputs of the selectors assigned to this order number being applied to the inputs of the gate assigned to this order number, the group of signals produced by the M gates and classified in accordance with the corresponding gate order numbers constituting the inlay hierarchical signal.

6. A system for generating electronically wide-angle moving images in accordance with claim 4, characterized by the fact that the inlay control circuit comprises:

M comparators assigned to M objects, each comparator being fed with the minimum order number signal as well as the order number signal corresponding to the object to which it is assigned, and producing an inlay order signal when the order number signal is identical with the minimum order number signal.

7. A system for generating electronically wide-angle moving images in accordance with claim 3, in which the moving image is constituted by the juxtaposition of Z groups of n elementary images representing M moving objects, characterized by the fact that it possesses Z groups of n monitors, said memory having Z groups of n tracks, Z inlay devices and M key signal selectors, each of these selectors having a first input to which is applied one of the inlay control signals obtained from the mask computing device P, Z outputs connected to the Z inlay devices, and a second input to which is applied a control signal produced by the interface.

8. A process in accordance with claim 1, or 2, wherein a plurality of objects are represented in the image, comprising the further steps of:

classifying and updating the objects as a function of their distances;

defining the presence or absence of an object in the direction defined by the image scan and determining for each an order number in accordance with the classification, the minimum order number corresponding to the minimum distance;

identifying the object having the minimum order number, and controlling for each point in the image and at each instant the appearance of the point of this object in the image.

* * * * *